(12) United States Patent
Roberson (10) Patent No.: US 10,400,587 B2
(45) Date of Patent: Sep. 3, 2019

(54) SYNCHRONIZING DOWNHOLE COMMUNICATIONS USING TIMING SIGNALS

(71) Applicant: HALLIBURTON ENERGY SERVICES, INC., Houston, TX (US)

(72) Inventor: Mark W. Roberson, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 100 days.

(21) Appl. No.: 15/539,743

(22) PCT Filed: Mar. 11, 2015

(86) PCT No.: PCT/US2015/019857
§ 371 (c)(1),
(2) Date: Jun. 26, 2017

(87) PCT Pub. No.: WO2016/144345
PCT Pub. Date: Sep. 15, 2016

(65) Prior Publication Data
US 2017/0350240 A1    Dec. 7, 2017

(51) Int. Cl.
*E21B 47/12* (2012.01)
*G01V 1/46* (2006.01)

(52) U.S. Cl.
CPC ............ *E21B 47/122* (2013.01); *E21B 47/12* (2013.01); *G01V 1/46* (2013.01); *G01V 2200/12* (2013.01)

(58) Field of Classification Search
CPC ......... E21B 47/122; E21B 47/12; G01V 1/46; G01V 2200/12
See application file for complete search history.

(56) References Cited

U.S. PATENT DOCUMENTS

| 4,390,975 A | 6/1983 | Shawhan |
| 5,148,408 A | 9/1992 | Matthews |
| 6,002,339 A * | 12/1999 | Norris ...................... G01V 1/26 340/540 |
| 10,107,926 B1 * | 10/2018 | Elder ...................... G01V 1/223 |
| 2003/0000703 A1 * | 1/2003 | Cernocky ........... E21B 43/1185 166/297 |
| 2004/0105341 A1 * | 6/2004 | Chamberlain ........... G01V 1/22 367/21 |
| 2008/0205191 A1 | 8/2008 | Coste et al. |

(Continued)

FOREIGN PATENT DOCUMENTS

| WO | 2014100272 | 6/2014 |
| WO | 2014107708 | 7/2014 |

OTHER PUBLICATIONS

International Patent Application No. PCT/US2015/019857, International Search Report and Written Opinion, dated Oct. 26, 2015, 14 pages.

*Primary Examiner* — Ian J Lobo
(74) *Attorney, Agent, or Firm* — Kilpatrick Townsend & Stockton LLP (57) ABSTRACT

A system that is positionable in a wellbore can include a transceiver that is positionable external to a casing string. The transceiver can be remotely programmable while in the wellbore to set an internal clock using a timing signal wirelessly transmitted from a source and a position of the transceiver in the wellbore relative to the source. The transceiver can use the internal clock for controlling a timing of the transceiver for transmitting a wireless signal.

20 Claims, 7 Drawing Sheets

(56) References Cited

U.S. PATENT DOCUMENTS

| | | |
|---|---|---|
| 2008/0217057 A1 | 9/2008 | Hall et al. |
| 2011/0251813 A1 | 10/2011 | Coman et al. |
| 2014/0091943 A1* | 4/2014 | Herrera Duarte ..... E21B 47/122 |
| | | 340/854.9 |
| 2014/0246237 A1 | 9/2014 | Prammer |
| 2014/0354446 A1 | 12/2014 | Nakayama et al. |

\* cited by examiner

SYNCHRONIZING DOWNHOLE COMMUNICATIONS USING TIMING SIGNALS

CROSS-REFERENCE TO RELATED APPLICATION

This is a U.S. national phase under 35 U.S.C. 371 of International Patent Application No. PCT/US2015/019857, titled "Synchronizing Downhole Communications Using Timing Signals" and filed Mar. 11, 2015, the entirety of which is incorporated herein by reference.

TECHNICAL FIELD

The present disclosure relates generally to devices for use in well systems. More specifically, but not by way of limitation, this disclosure relates to synchronizing downhole communications using timing signals.

BACKGROUND

A well system (e.g., an oil or gas well for extracting fluid or gas from a subterranean formation) can include various sensors. For example, a well system can include sensors for measuring well system parameters, such as temperature, pressure, resistivity, or sound levels. It may be desirable to transmit sensor data to a well operator (e.g., typically at the surface of the well system). It can be challenging to communicate data from the sensors to the well surface efficiently.

DETAILED DESCRIPTION

Certain aspects and features of the present disclosure relate to synchronizing downhole communications using timing signals. The downhole communications can be wireless communications between transceivers positioned external to a casing string in a wellbore. A transceiver can be positioned external to the casing string if the transceiver is positioned on or external to an outer diameter or outer wall of the casing string. The transceivers can use the timing signals to control when and for how long the transceivers can wirelessly communicate, thereby synchronizing (e.g., coordinating) wireless communications between the transceivers.

The transceivers can be remotely programmed, while the transceivers are in the wellbore, to wirelessly communicate data (e.g., wirelessly transmit and receive data) at particular times. For example, a timing source can transmit a timing signal to the transceivers. The timing source can be another transceiver in the wellbore or a computing device at the well surface. The transceivers can receive the timing signal and set respective internal clocks based on data from the timing signal. This can synchronize wireless communications among the transceivers. In some examples, each of the transceivers can additionally or alternatively be remotely programmed to wirelessly communicate data for a specific duration of time. For example, one transceiver can be remotely programmed to transmit data for 8 milliseconds (ms) at a particular time while another transceiver can be remotely programmed to transmit data for 10 ms at a different time. Synchronizing when, and for how long, the transceivers can wirelessly communicate data can reduce interference due to the transceivers transmitting wireless signals substantially simultaneously.

The transceivers can set respective internal clocks to synchronize wireless communications among the transceivers. Each of the transceivers can set an internal clock to a common reference time (e.g., a reference time common to all the transceivers). The common reference time can be calculated based on a time the transceiver received the timing signal and the position of the transceiver in the wellbore.

For example, the timing source can wirelessly transmit the timing signal at a particular time. Because the transceivers can each be positioned in the wellbore at different distances from the timing source, there can be different time delays between when the timing source transmits the timing signal and when each transceiver receives the timing signal. For example, one transceiver can receive the timing signal after a 3 second delay and another transceiver can receive the timing signal after a 5 second delay.

The transceivers can each determine a respective time delay by dividing (i) the distance between the transceiver and the timing source by (ii) the speed of sound (or the speed of light, depending on the type of wireless communication transmitted by the source). The transceivers can each subtract the respective time delay from the time the transceiver received the timing signal to determine the common reference time. The transceivers can set the respective internal clocks to the common reference time, thereby synchronizing the internal clocks among the transceivers.

The transceivers can determine when to wirelessly communicate when the internal clocks are synchronized. The transceivers can each determine when to wirelessly communicate based on data from the timing signal. Each transceiver can extract data from the timing signal for use in determining a delay after the common reference time to wirelessly communicate. For example, one transceiver can extract data from the timing signal that indicates that the transceiver can transmit signals 10 seconds after the common reference time. Another transceiver can extract data from the timing signal that indicates that the other transceiver can transmit signals 20 seconds after the common reference time. In this manner, the transceivers can wirelessly communicate at different times, which can reduce interference due to the transceivers transmitting wireless signals substantially simultaneously.

In some examples, the timing signal can be communicated downhole in "hops." For example, multiple transceivers can be positioned in the wellbore. The timing source can be positioned at the surface of the wellbore and transmit the timing signal to a transceiver closest to the surface. The transceiver can receive the timing signal and communicate the timing signal to another transceiver positioned farther downhole. This process can continue until the farthest-most transceiver from the well surface has received the timing signal. In this manner, each transceiver can receive a timing signal from another transceiver closer to the well surface and communicate the timing signal to still another transceiver farther from the well surface.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
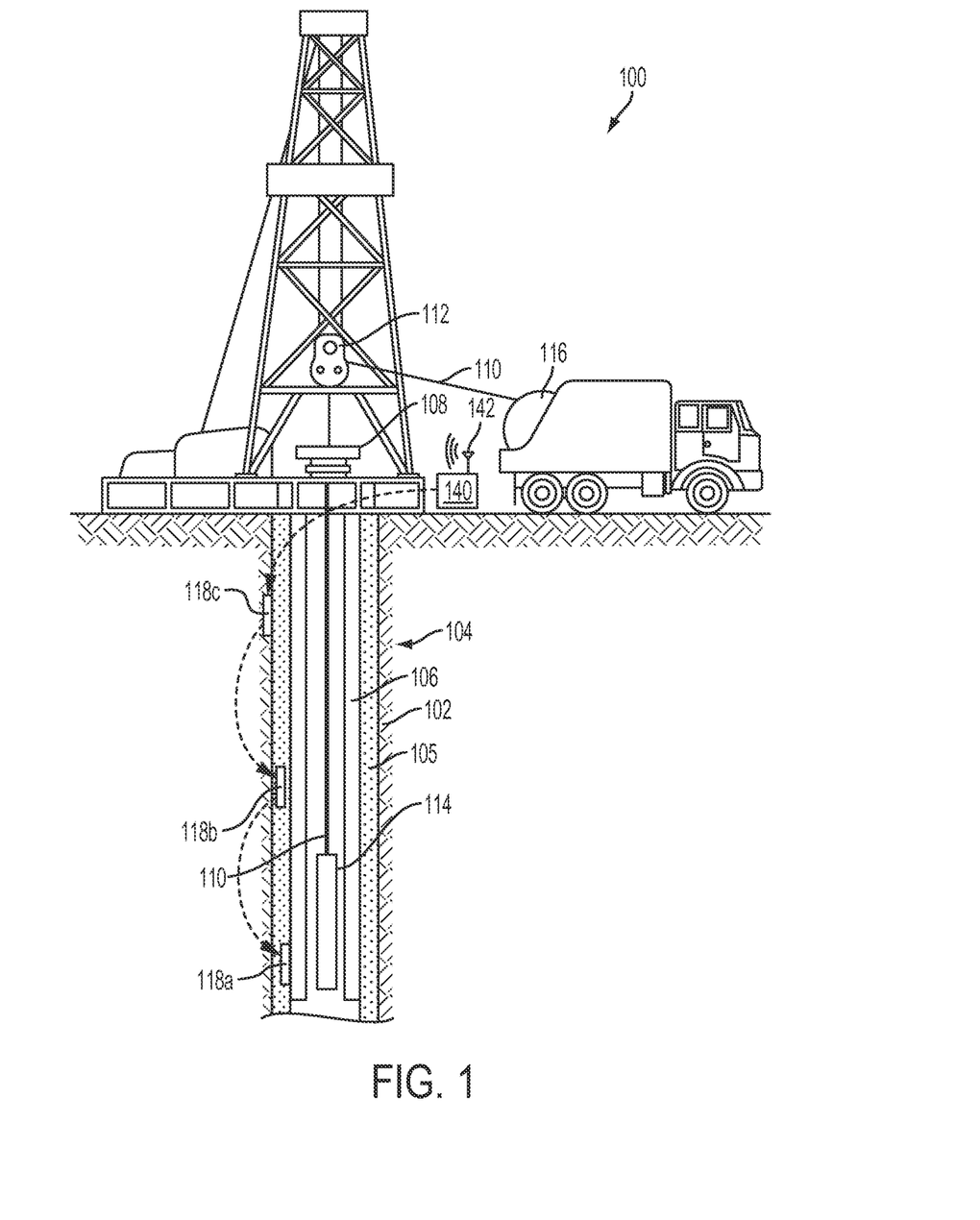
FIG. 1 is a cross-sectional view of an example of a well system that includes a system for synchronizing downhole communications using timing signals according to some aspects.

FIG. 1 is a cross-sectional view of an example of a well system 100 that includes a system for synchronizing downhole communications using timing signals. The well system 100 includes a wellbore 102 extending through various earth strata. The wellbore 102 extends through a hydrocarbon bearing subterranean formation 104. The well system 100 can also include a casing string 106 that extends from the surface 108 to the subterranean formation 104. The casing string 106 can provide a conduit through which formation fluids, such as production fluids produced from the subterranean formation 104, can travel from the wellbore 102 to the surface 108. The casing string 106 can be coupled to the walls of the wellbore 102 via cement. For example, a cement sheath 105 can be positioned (e.g., formed) between the casing string 106 and the walls of the wellbore 102 for coupling the casing string 106 to the wellbore 102.

The well system 100 can also include at least one well tool 114 (e.g., a measuring-while-drilling ("MWD") tool, a logging-while-drilling ("LWD") tool, or a wireline formation-testing tool). The well tool 114 can be coupled to a wireline 110, slickline, or coiled tubing that can be deployed into the wellbore 102. The wireline 110, slickline, or coiled tubing can be guided into the wellbore 102 using, for example, a guide 112 or winch. In some examples, the wireline 110, slickline, or coiled tubing can be wound around a reel 116.

The well system 100 can include a computing device 140. The computing device 140 can be positioned at the surface 108 of the wellbore, below ground, or offsite. The computing device 140 can include a processor interfaced with other hardware via a bus. A memory, which can include any suitable tangible (and non-transitory) computer-readable medium, such as RAM, ROM, EEPROM, or the like, can embody program components that configure operation of the computing device 140. In some aspects, the computing device 140 can include input/output interface components (e.g., a display, keyboard, touch-sensitive surface, and mouse) and additional storage.

The computing device 140 can include a communication device 142. The communication device 142 can represent one or more of any components that facilitate a network connection. In the example shown in FIG. 1, the communication device 142 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 142 can use acoustic waves, mud pulses, surface waves, vibrations, optical waves, or induction (e.g., magnetic induction) for engaging in wireless communications. In other examples, the communication device 142 can be wired and can include interfaces such as Ethernet, USB, IEEE 1394, or a fiber optic interface.

The well system 100 can include transceivers 118a-c. In some examples, each of the transceivers 118a-c can be positioned on, partially embedded within, or fully embedded within the casing string 106, the cement sheath, or both. In some examples, the transceivers 118a-c can be positioned externally to the casing string 106. For example, the transceiver 118a can be positioned on an outer housing of the casing string 106, the transceiver 118b can be positioned within the cement sheath 105, and the transceiver 118 can be positioned within the subterranean formation 104 (e.g., by using a flex centralizer). Positioning the transceivers 118a-c externally to the casing string 106 can be advantageous over positioning the transceivers 118a-c elsewhere in the well system 100, such as within the casing string 106, which can affect a drift diameter of the casing string 106. Additionally, positioning the transceivers 118a-c externally to the casing string 106 can allow the transceivers 118a-c to more accurately and efficiently detect characteristics of the subterranean formation 104, the cement sheath 105, and the casing string 106.

In some examples, the computing device 140 can transmit a timing signal substantially simultaneously to all of the transceivers 118a-c. Each of the transceivers 118a-c can receive the timing signal. Each of the transceivers 118a-c can set respective internal clocks based on data from the timing signal and the respective positions of each of the transceivers 118a-c in the wellbore.

In some examples, the transceivers 118a-c can communicate the timing signal from the computing device 140 downhole in "hops". For example, the computing device 140 can transmit a timing signal to the transceiver 118c. The transceiver 118c can receive the timing signal and transmit the timing signal to the transceiver 118b positioned farther downhole. The transceiver 118b can receive the timing signal and transmit the timing signal to the transceiver 118a positioned even farther downhole. In this manner, the transceivers 118a-c can receive a timing signal and relay the timing signal to other transceivers 118a-c.

In some examples, one of the transceivers 118a-c can be the timing source. For example, in the absence of computing device 140, transceiver 118c can be used to generate the timing signal. The transceiver 118c can transmit the timing signal to the transceiver 118b. The transceiver 118b can receive the timing signal and transmit the timing signal to the transceiver 118a. In another example, transceiver 118a can be the timing source and transmit a timing signal to transceiver 118b. Transceiver 118b can receive the timing signal and transmit the timing signal to transceiver 118c. In this manner, one of the transceivers 118a-c can be the timing source for the other transceivers 118a-c.

In some examples, synchronizing wireless communications among the transceivers 118a-c can allow the transceivers 118a-c to wirelessly communicate data in segments or "hops" to a destination (e.g., uphole or downhole). For example, a transceiver 118c can wirelessly communicate data to another transceiver 118b (e.g., positioned farther downhole), which can relay the data to still another transceiver 118a (e.g., positioned even farther downhole), and so on. As another example, one transceiver 118b can wirelessly communicate data to another transceiver 118c, which can relay the data to a destination (e.g., the computing device 140).

Figure 2:
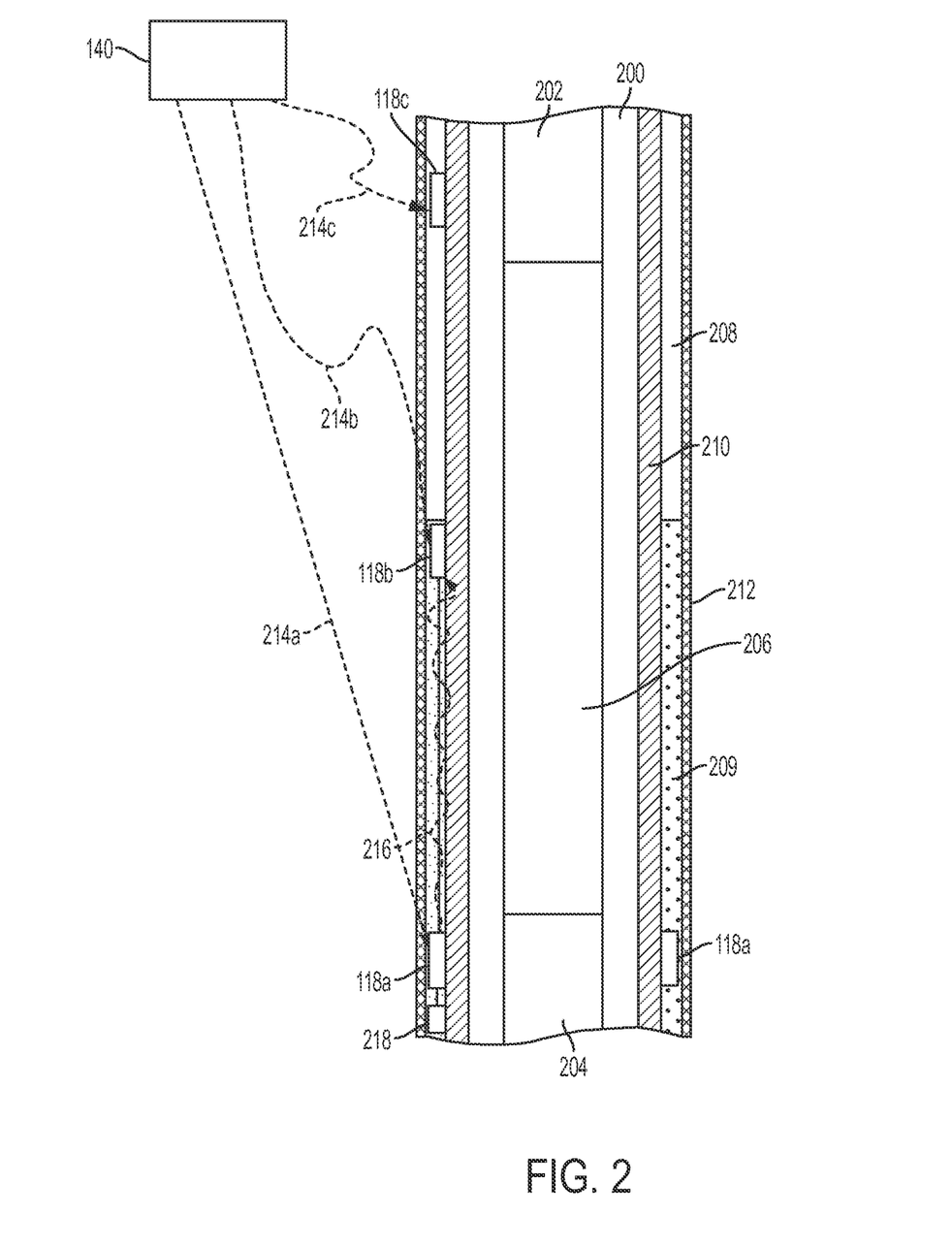
FIG. 2 is a cross-sectional side view of an example of part of a well system for synchronizing downhole communications using timing signals that includes transceivers according to some aspects.

FIG. 2 is a cross-sectional side view of an example of part of a well system for synchronizing downhole communications using timing signals that includes transceivers 118a-c. The transceivers 118a-c can be positioned on or external to a casing string 210 in a wellbore. For example, the transceiver 118a can be positioned coaxially around an outer housing of the casing string 210. In some examples, a well tool 200 can be positioned within the casing string 210. The well tool 200 can include multiple subsystems 202, 204, 206.

Fluid 209 (e.g., cement, mud, a spacing fluid, or a hydrocarbon) can be positioned in a space 208 between the casing string 210 and the subterranean formation 212. For example, a fluid 209 containing cement can be pumped into the space 208 during cementing operations.

In some examples, each of the transceivers 118a-c can include or be electrically coupled to a sensor. In the example shown in FIG. 2, the transceiver 118a is electrically coupled to a sensor 218 by a wire. Examples of the sensor 218 can include a pressure sensor, a temperature sensor, and a depth sensor. In some examples, the sensor 218 can detect the position of the transceiver 118a in the wellbore. As another example, the sensor 218 can detect the temperature at the position of the transceiver 118a in the wellbore.

The sensor 218 can transmit sensor signals to a processor (e.g., a processor associated with the transceiver 118a). The sensor signals can be representative of sensor data. The processor can receive the sensor signals and cause the transceiver 118a to apply the sensor data to one or more algorithms (described below). For example, the processor can receive the sensor signals and cause the transceiver 118a to apply the sensor data to an algorithm to determine the speed of sound at the position of the transceiver 118a in the wellbore. In some examples, the processor can receive the sensor signals and cause the transceiver to communicate the sensor data (e.g., to another transceiver 118b). For example, the processor can transmit signals to an antenna to generate wireless signals 216 representative of sensor data.

As discussed above with respect to FIG. 1, the computing device 140 can transmit timing signals to the transceivers 118a-c. For example, the computing device 140 can transmit a timing signal 214c to the transceiver 118c, a timing signal 214b to the transceiver 118b and a timing signal 214a to the transceiver 118a. The transceivers 118a-c can set respective internal clocks based on data from the respective timing signals 214a-c and the respective positions of each of the transceivers 118a-c in the wellbore.

Each of the transceivers 118a-c can set an internal clock to a common reference time determined based on a respective time each transceiver 118a-c received a respective timing signal 214a-c and a respective position of the transceiver 118a-c in the wellbore. For example, the computing device 140 can transmit the timing signals 214a-c to the transceivers 118a-c. Because each of the transceivers 118a-c can be positioned in the wellbore at a different distance from the timing source, there can be different time delays between when the computing device 140 transmits the timing signals 214a-c and when each of the transceivers 118a-c receives the respective timing signal 214a-c. For example, the transceiver 118c can receive the timing signal 214c after a 5 second delay. The transceiver 118b can receive the timing signal 214b after a 10 second delay. The transceiver 118a can receive the timing signal 214a after a 20 second delay.

Each of the transceivers 118a-c can determine the respective time delays by dividing (i) the distance between the transceivers 118a-c and the computing device 140 by (ii) the speed of sound (or the speed of light, depending on the type of wireless communication transmitted by the computing device 140). The transceivers 118a-c can each subtract the respective time delay from the time the transceivers 118a-c received the respective timing signals 214a-c to determine the common reference time.

In some examples, the transceivers 118a-c can determine the distance between the transceivers 118a-c and the computing device 140. For example, the transceiver 118a can determine the distance based on data from a sensor 218 (e.g., a GPS unit that provides data about a location of the transceiver 118a in the wellbore). In other examples, the transceiver 118a can determine the distance between the transceivers 118a and the computing device 140 based on a known position of the transceiver 118a programmed into the memory of the transceiver 118a prior to the transceiver 118a being positioned in the wellbore.

In some examples, the transceivers 118a-c can use a temperature to calculate the speed of sound (or the speed of light). For example, the transceiver 118a can determine the temperature at the position in the wellbore based on data from the sensor 218 (e.g., a temperature sensor) or from another sensor included in the transceiver 118a. The transceiver 118a can apply the temperature to one or more algorithms to determine the speed of sound (or speed of light). For example, the transceiver 118a can determine the speed of sound by dividing (i) the product of an adiabatic constant, a universal gas constant, and the temperature by (ii) a molecular weight of gas at the position of the transceiver in the wellbore. This equation is described in greater detail with respect to FIG. 5. In other examples, the temperature can be programmed into the memory of the transceiver 118a prior to the transceiver 118a being positioned in the wellbore.

Each of the transceivers 118a-c can determine the respective time delay in substantially the same manner. The transceivers 118a-c can subtract the respective time delays from a particular time each of the transceivers 118a-c receives the respective timing signals 214a-c to determine the common reference time. The transceivers 118a-c can set the respective internal clocks to the common reference time, thereby synchronizing the internal clocks among the transceivers 118a-c.

Synchronizing the transceivers 118a-c can allow each of the transceivers 118a-c to determine when to wirelessly communicate data. The transceivers 118a-c can each determine when to wirelessly communicate based on data from the respective timing signals 214a-c. Each transceiver 118a-c can extract data from the respective timing signals 214a-c for use in determining a time delay after the common reference time to wirelessly communicate.

Figure 3:
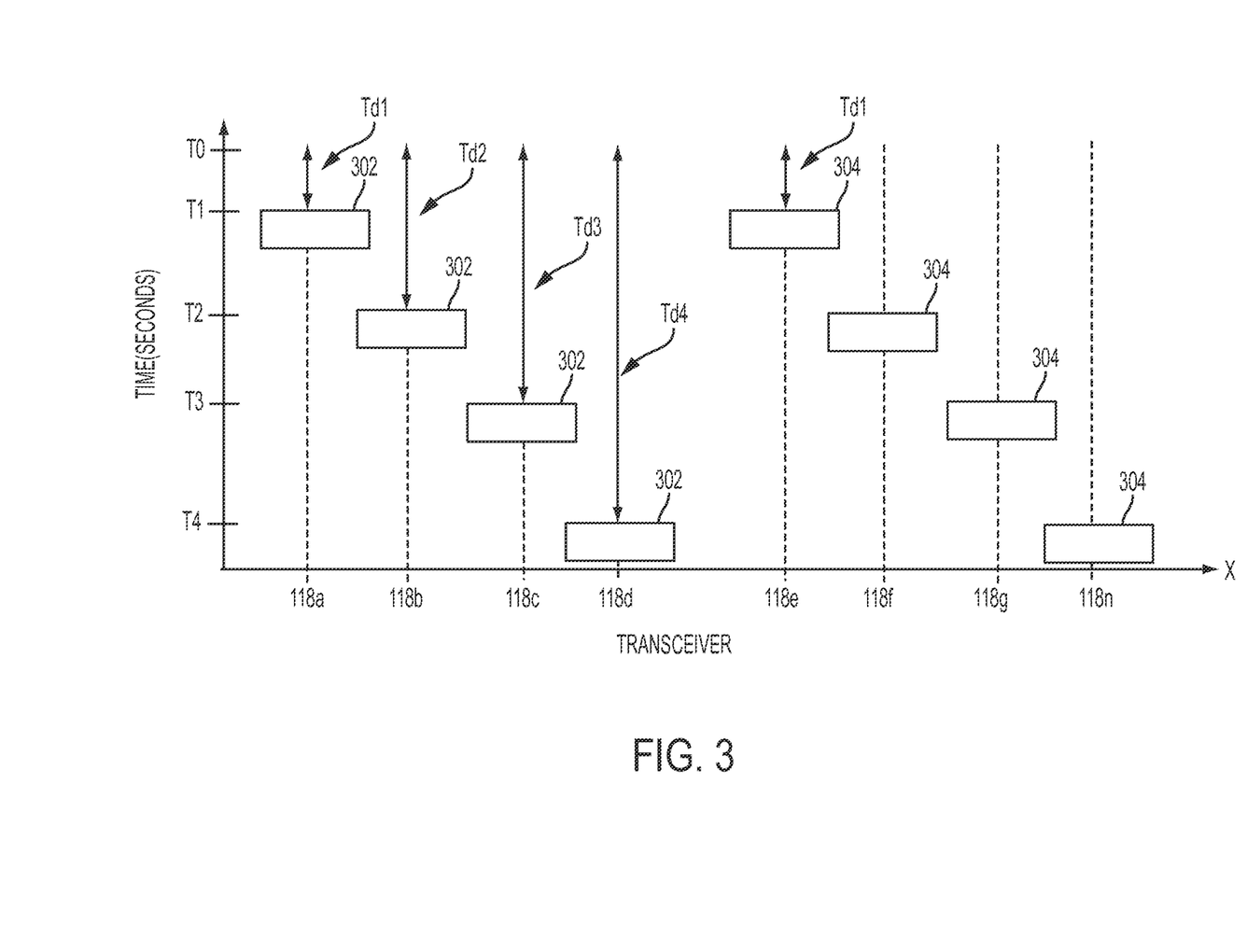
FIG. 3 is a graph depicting an example of synchronizing downhole communications using timing signals according to some aspects.

FIG. 3 is a graph depicting an example of synchronizing downhole communications using timing signals. The graph shows multiple transceivers 118a-n along the X-axis. The transceivers 118a-n are arranged in order based on a position of the transceivers 118a-n in the wellbore relative to a timing source. For example, the transceiver 118a can be positioned closest to the timing source and transceiver 118n can be positioned farthest from the timing source.

In this example, each of the transceivers 118a-n have received respective timing signals and set respective internal clocks to a common reference time $T_0$. The transceivers 118a-n can each wirelessly communicate at a delay $T_{d1}$, $T_{d2}$, $T_{d3}$, $T_{d4}$ from the common reference time $T_0$. For example, the transceiver 118a can wirelessly communicate a data packet 302 to the transceiver 118b at a particular time $T_1$ after time delay $T_{d1}$ (e.g., 10 seconds) from the common reference time $T_0$. As another example, the transceiver 118b can receive data packet 302 and wirelessly communicate the data packet 302 to transceiver 118c after time delay $T_{d2}$ (e.g., 20 seconds) from the common reference time $T_0$. As still another example, transceiver 118c can receive the data packet 302 and wirelessly communicate the data packet 302 after time delay $T_{d3}$ to transceiver 118d, which can receive and relay the data packet 302 to a destination device.

Each of the transceivers 118a-n can be assigned time delays $T_{d1}$, $T_{d2}$, $T_{d3}$, $T_{d4}$. For example, the timing signals can include time delays assigned to respective transceivers 118a-c. The transceivers 118a-n can extract the time delays from the timing signals for use as the time delays $T_{d1}$, $T_{d2}$, $T_{d3}$, $T_{d4}$. In some examples, at least two transceivers 118a, 118e can have the same time delay $T_{d1}$. Because the transceivers 118a, 118e may be far apart, there may be little chance of interference due to substantially simultaneous wireless transmissions from the transceivers 118a, 118e. In other examples, signal attenuation, or reduction of signal strength through a medium, can reduce the chance of interference due to substantially simultaneous wireless transmissions from the transceivers 118a, 118e. This may allow for reuse of timing sequences among groups of transceivers 118-d, 118e-n.

In some examples, the time delays $T_{d1}$, $T_{d2}$, $T_{d3}$, $T_{d4}$ can be pseudorandom delays. For example, transceiver 118a can generate a pseudorandom delay $T_{d1}$ (e.g., 10 seconds) that is different from another pseudorandom delay $T_{d4}$ (e.g., 40 seconds) generated by transceiver 118c. Using pseudorandom delays may reduce interference due to the transceivers 118a-n transmitting wireless signals substantially simultaneously.

In some examples, each of the transceivers 118a-n can additionally or alternatively be remotely programmed to wirelessly communicate data for a specific duration of time. For example, the transceiver 118a can be remotely programmed to wirelessly communicate for a duration of time between $T_1$ and $T_2$. As an example, the duration of time between $T_1$ and $T_2$ can be the duration of time between the time delay $T_{d1}$ and the time delay $T_{d2}$ (e.g., 10 seconds). Synchronizing when, and for how long, the transceivers 118a-n can wirelessly communicate data can reduce interference due to the transceivers transmitting wireless signals substantially simultaneously.

Figure 4:
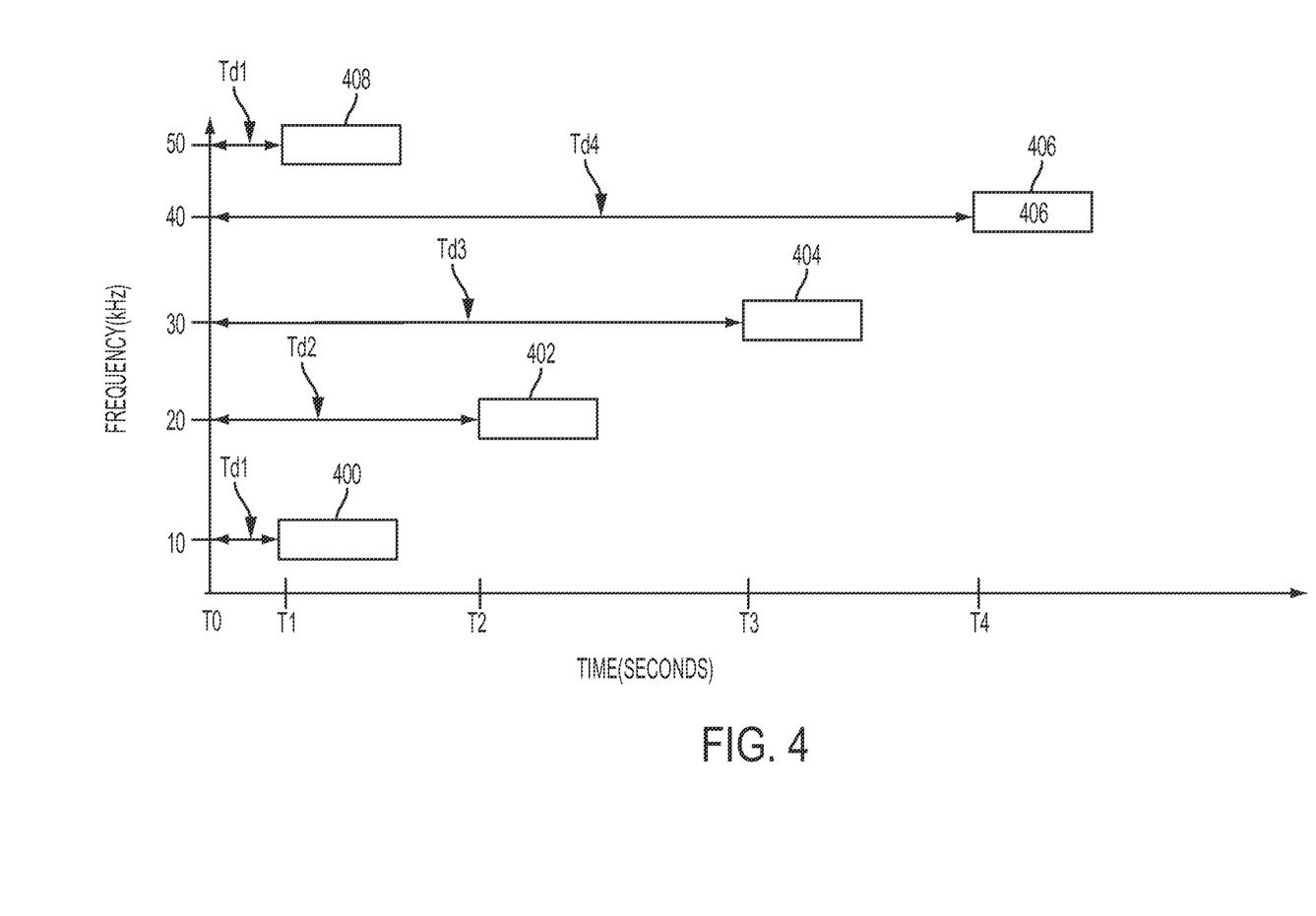
FIG. 4 is a graph depicting another example of synchronizing downhole communications using timing signals according to some aspects.

In some examples, the transceivers 118a-n can be remotely programmed to wirelessly communicate over different frequencies, as described in greater detail with respect to FIG. 4.

FIG. 4 is a graph depicting another example of synchronizing downhole communications using timing signals. In some examples multiple transceivers (e.g., the transceivers 118a-n of FIG. 3) can wirelessly communicate over different frequencies after time delays $T_{d1}$, $T_{d2}$, $T_{d3}$, $T_{d4}$ from a common reference time $T_0$. For example, one transceiver can wirelessly communicate a data packet 400 using a frequency (e.g., 10 kHz) at a time $T_1$. Another transceiver can wirelessly communicate another data packet 408 using a different frequency (e.g., 50 kHz) at the same time $T_1$. Still another transceiver can wirelessly communicate still another data packet 402 over still another frequency (e.g., 20 kHz) at a time $T_2$. In this manner, any of the transceivers 118a-n can wirelessly communicate at the same time but using different frequencies. This can reduce interference due to the transceivers 118a-n transmitting wireless signals substantially simultaneously.

Figure 5:
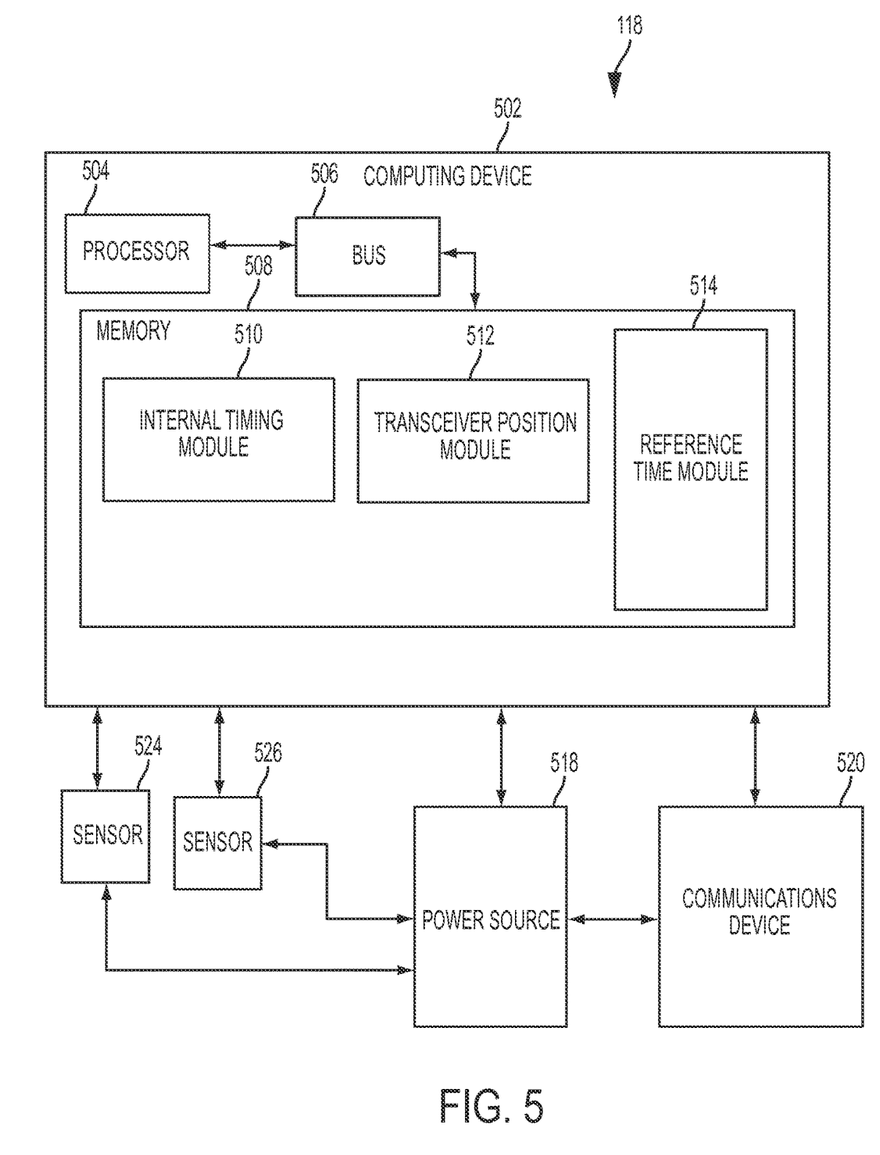
FIG. 5 is a block diagram of an example of a transceiver for synchronizing downhole communications using a timing signal according to some aspects.

FIG. 5 is a block diagram of an example of a transceiver 118 for synchronizing downhole communications using a timing signal. In some examples, the components shown in FIG. 5 (e.g., the computing device 502, power source 518, sensors 524, sensor 526, and communications device 520) can be integrated into a single structure. For example, the components can be within a single housing or chassis. In other examples, the components shown in FIG. 5 can be distributed (e.g., in separate housings) and in electrical communication with each other.

The transceiver 118 can include a computing device 502. The computing device 502 can include a processor 504, a memory 508, and a bus 506. The processor 504 can execute one or more operations for operating the transceiver 118. The processor 504 can execute instructions stored in the memory 508 to perform the operations. The processor 504 can include one processing device or multiple processing devices. Non-limiting examples of the processor 504 include a Field-Programmable Gate Array ("FPGA"), an application-specific integrated circuit ("ASIC"), a microprocessor, etc.

The processor 504 can be communicatively coupled to the memory 508 via the bus 506. The memory 508 may include any type of memory device that retains stored data when powered off. Non-limiting examples of the memory 508 include electrically erasable and programmable read-only memory ("EEPROM"), flash memory, or any other type of non-volatile memory. In some examples, at least some of the memory 508 can include a computer-readable medium from which the processor 504 can read the instructions. The computer-readable medium can include electronic, optical, magnetic, or other storage devices capable of providing the processor 504 with computer-readable instructions or other program code. Non-limiting examples of a computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 508 can include various modules 510, 512, 514 for enabling the synchronizing of downhole communications using a timing signal. The memory 508 can include an internal timing module 510 for enabling the synchronizing of downhole communications using a timing signal. The internal timing module 510 can include instructions for causing the transceiver 118 to wirelessly communicate at a particular time of day. In some examples, the internal timing module 510 can include instructions for causing the transceiver 118 to use data included in a timing signal wirelessly transmitted from a source. The internal timing module 510 can include instructions for causing the transceiver 118 to use the timing signal and a position of the transceiver in the wellbore relative to the source to control when the transceiver can wirelessly communicate. For example, the internal timing module 510 can include instructions for causing the transceiver to transmit a wireless communication at 9:00 AM. In some examples, the internal timing module 510 can include instructions for causing the transceiver 118 to synchronize the internal timing module 510 with an internal timing module of another transceiver 118 by setting the internal timing module 510 to a common reference time.

In some examples the internal timing module 510 can include instructions for causing the transceiver 118 to wirelessly communicate for a specific duration of time. In some examples, the internal timing module 510 can include instructions for causing the transceiver 118 to use data included in the timing signal to control the duration of time that the transceiver can transmit the wireless communication. For example, the internal timing module 510 can include instructions for causing the transceiver 118 to transmit the wireless communication for 8 ms.

In some examples, the memory 508 can include a transceiver position module 512. The transceiver position module 512 can include instructions for determining a position of the transceiver 118 in a well system. The transceiver position module 512 can include instructions for receiving a sensor signal (e.g., from a sensor 524 or 526) or user input (e.g., if the user programs the transceiver 118 to include a known position prior to positioning the transceiver 118 in the wellbore 102). The sensor signal can include a position of the transceiver 118 in the wellbore relative to the source of the timing signal.

In some examples, the memory 508 can include a reference time module 514. The reference time module 514 can include instructions for causing the transceiver 118 to determine a common reference time using one or more algorithms. For example, the reference time module 514 can include instructions for causing the transceiver 118 to apply sensor data (e.g., data from the sensor 524, 526 about a temperature in the wellbore) or user input (e.g., if the user programs the transceiver 118 to include a known temperature prior to positioning the transceiver 118 in the wellbore 102) to an algorithm. The reference time module 514 can include instructions for causing the transceiver 118 to apply the data to an algorithm to determine the speed of sound at the position of the transceiver 118 in the wellbore. For example, the reference time module 514 can apply the temperature to the following equation:

$$V_{sound} = \sqrt{\frac{\gamma RT}{M}}$$

where $\gamma$ is the adiabatic constant characteristic of a specific gas at the position of the transceiver 118; T is the absolute temperature (273.15+° C.) at the position of the transceiver 118; M is the molecular weight of the gas at the position of the transceiver 118 in kg/mol; R is the universal gas constant equal to 8.314 J/mol K; and $V_{sound}$ is the speed of sound.

In some examples, the reference time module 514 can include instructions for causing the transceiver 118 to apply sensor data (e.g., data about a state of a substance in the wellbore) to an algorithm to determine a speed of light in the wellbore. For example, the reference time module 514 can apply data about the state of a substance:

$$V = c/n$$

where c is the speed of light in a vacuum (e.g., 2.99792458×10$^8$ m/s); n is an index of refraction of the substance at the position of the transceiver 118; and V is the speed of light at the position of the transceiver 118.

In some examples, the reference time module 514 can include instructions for determining a time delay. The reference time module 514 can apply data about the position of the transceiver 118 in the wellbore, the temperature in the wellbore at the position of the transceiver 118, and a speed of sound or a speed of light to an algorithm to determine a time delay. For example, the reference time module 514 can apply the position of the transceiver 118 and a speed of sound to the following equation:

$$\frac{d}{V_{sound}} = t$$

where d is the position of the transceiver 118 in the wellbore, $V_{sound}$ is the speed of sound at the position of the transceiver 118, and t is the time delay. The time delay can be a difference in time between the time that the source transmits the timing signal and a particular time that the transceiver 118 receives the timing signal. The reference time module 514 can include instructions for causing the transceiver 118 to determine the common reference time by subtracting the time delay from the particular time that the transceiver receives the timing signal. In some examples, the reference time module 514 can include instructions for operating the internal timing module 510 based on the reference time. For example, the reference time module 514 can cause the internal timing module 510 to use the reference time to synchronize respective internal timing modules with another transceiver.

The transceiver 118 can include the power source 518. The power source 518 can be in electrical communication with the computing device 502, and the communications device 520. In some examples, the power source 518 can include a battery (e.g., for powering the transceiver 118 or sensors 524, 526). In other examples, the transceiver 118 can be coupled to and powered by an electrical cable (e.g., a wireline). Additionally or alternatively, the power source 518 can include an AC signal generator. The computing device 502 can operate the power source 518 to apply a transmission signal to the communications device 520. For example, the computing device 502 can cause the power source 518 to apply a voltage with a frequency to the communications device 520 for generating a wireless transmission.

In some examples, part of the communications device 520 can be implemented in software. For example, part of the communications device 520 can include instructions stored in memory 508. In some examples, the communications device 520 can be substantially the same as the communication device 142 of FIG. 1.

The communications device 520 can include or can be coupled to an antenna. The communications device 520 can detect or receive wireless signals (e.g., from another transceiver or a computing device) via the antenna. In some examples, the communications device 520 can amplify, filter, modulate, frequency shift, and otherwise manipulate the detected signals. The communications device 520 can transmit a signal associated with the detected signals to the processor 504. In some examples, the processor 504 can receive and analyze the signal to retrieve data associated with the detected signals.

In some examples, the processor 504 can analyze the data and perform one or more functions. For example, the data can be from a timing signal and can be indicative of a time delay after the common reference time that the transceiver 118 can transmit a wireless communication. The processor 504 can receive the data and use the internal timing module 510 to control a timing of the transceiver 118 for transmitting the wireless communication.

In some examples, the communications device 520 can receive signals (e.g., associated with signals or data to be transmitted) from the processor 504 and amplify, filter, modulate, frequency shift, and otherwise manipulate the signals. The communications device 520 can transmit the manipulated signals to an antenna to generate wireless signals representative of the data.

In some examples, the transceiver 118 can include one or more sensors 524, 526. Examples of the sensors 524, 526 can include pressure sensors, temperature sensors, microphones, accelerometers, depth sensors, resistivity sensors, vibration sensors, ultrasonic transducers, fluid analyzers or sensors, and RFID readers. The sensors 524, 526 can transmit data to the processor 504 (e.g., for analysis or communication to other transceivers).

Figure 6:
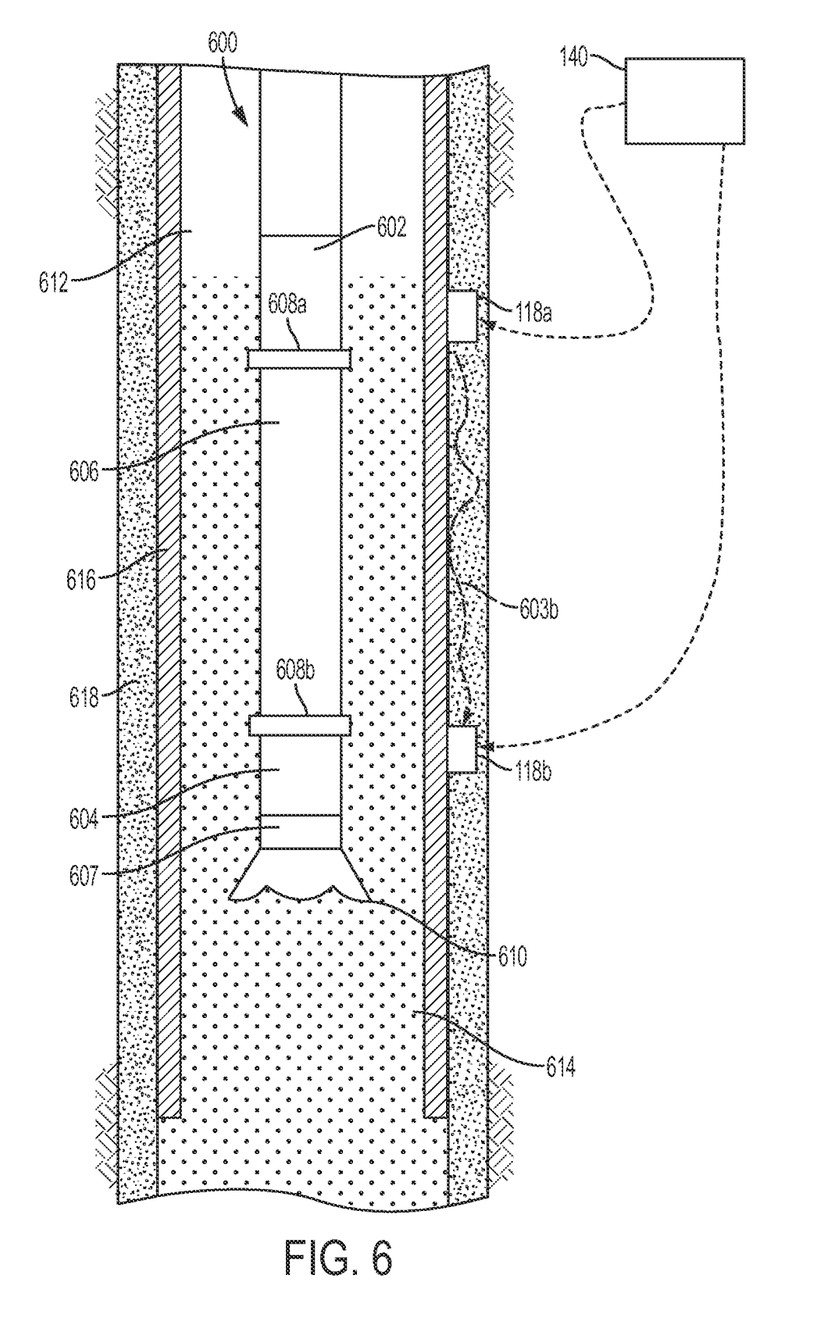
FIG. 6 is a cross-sectional side view of another example of part of a well system for synchronizing downhole communications using timing signals according to some aspects.

FIG. 6 is a cross-sectional side view of another example of part of a well system for synchronizing downhole communications using timing signals. In this example, the well system includes a wellbore. The wellbore can include a casing string 616 and a cement sheath 618. The wellbore can include a fluid 614. The fluid 614 (e.g., mud) can flow in annulus 612 positioned between a well tool 600 and a wall of the casing string 616.

The well tool 600 (e.g., logging-while-drilling tool) can be positioned in the wellbore. The well tool 600 can include various subsystems 602, 604, 606, 607. For example, the well tool 600 can include a subsystem 602 that includes a communication subsystem. The well tool 600 can also include a subsystem 604 that includes a saver subsystem or a rotary steerable system. A tubular section or an intermediate subsystem 606 (e.g., a mud motor or measuring-while drilling module) can be positioned between the subsystems 602, 604. In some examples, the well tool 600 can include a drill bit 610 for drilling the wellbore. The drill bit 610 can be coupled to another tubular section or intermediate subsystem 607 (e.g., a measuring-while-drilling module or a rotary steerable system).

The well tool 600 can also include tubular joints 608a, 608b. Tubular joint 608a can prevent a wire from passing between subsystem 602 and the intermediate subsystem 606. Tubular joint 608b can prevent a wire from passing between the other subsystem 604 and the intermediate subsystem 606. The tubular joints 608a, 608b may make it challenging to communicate data through the well tool 600. It may be desirable to communicate data externally to the well tool 600, for example, using transceivers 118a-b.

The transceivers 118a-b can be positioned external to the casing string 616. The transceivers 118a-b can be individually programmed while in the wellbore to set an internal clock based on a timing signal wirelessly transmitted from a source. Each transceiver 118a-b can use the respective internal clocks for controlling a timing of the transceiver for transmitting a wireless communication. In some examples, the source of the timing signal can be the computing device 140. The computing device 140 can be positioned at a surface of the wellbore. The computing device 140 can transmit a timing signal to the transceiver 118a. The computing device 140 can transmit a timing signal to the transceiver 118b. As another example, in the absence of the computing device, the transceiver 118a can be the source of the timing signal. The transceiver 118a can generate a timing signal 603b and transmit the timing signal 603b to transceiver 118b.

Figure 7:
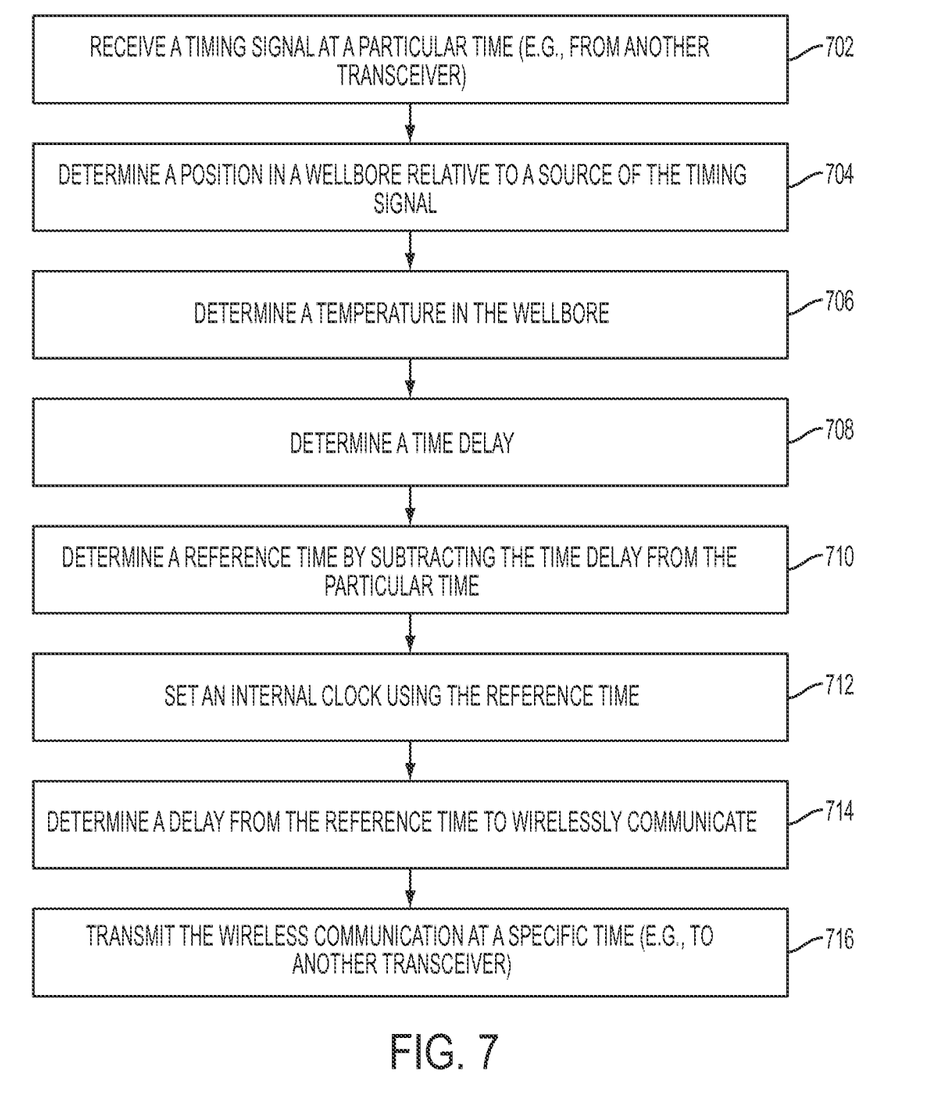
FIG. 7 is a flow chart depicting an example of a process for synchronizing downhole communications using timing signals according to some aspects.

FIG. 7 is a flow chart depicting an example of a process for synchronizing downhole communications using timing signals.

In block 702, a transceiver receives a timing signal at a particular time. The transceiver can wirelessly receive the timing signal from a source while the transceiver is positioned in a wellbore. The source can be a computing device (e.g., the computing device 140 of FIG. 1) or another transceiver.

In block 704, the transceiver determines a position in the wellbore relative to the source of the timing signal. The transceiver can determine a position of the transceiver in the wellbore relative to the source of the timing signal using data from a sensor (e.g., a GPS unit that provides data about a location of the transceiver in the wellbore). The transceiver can receive the sensor data and determine the position of the transceiver in the wellbore (e.g., using the transceiver position module 512 of FIG. 5). In some examples, the transceiver can be programmed to include a known position of the transceiver relative to the source prior to the transceiver being positioned in the wellbore.

In block 706, the transceiver determines a temperature in the wellbore. The transceiver can determine the temperature in the wellbore using data from a sensor (e.g., a temperature sensor). The transceiver can receive data about the temperature at the position of the transceiver in the wellbore from the sensor. The sensor can transmit the data to a processor within the transceiver. In some examples, the transceiver can be programmed to include the temperature in the wellbore prior to the transceiver being positioned in the wellbore.

In block 708, the transceiver determines a time delay. The transceiver can determine a time delay by applying data about the position of the transceiver from block 704, the temperature in the wellbore at the position of the transceiver from block 706, and a speed of sound or a speed of light to an algorithm to determine a time delay. The algorithm can be stored in a reference time module in memory (e.g., the reference time module 514 of FIG. 5). The time delay can be a delay between the particular time that the transceiver receives the timing signal and a time that the source wirelessly transmitted the timing signal to the transceiver.

In block 710, the transceiver determines a reference time by subtracting the time delay from the particular time that the transceiver received the timing signal. The reference time can be a common reference time among multiple transceivers (e.g., a reference time common to all the transceivers).

In block 712, the transceiver sets an internal clock using the reference time. For example, the internal clock can be a software component stored in memory or a hardware component (e.g., the internal timing module 510 of FIG. 5). The internal clock can be set to include the reference time by updating a memory location or transmitting a signal to the hardware component. For example, the memory location can be updated by a processor associated with the transceiver (e.g., the processor 504 of FIG. 5).

In block 714, the transceiver can determine a delay from the reference time to wirelessly communicate. For example, the timing signal can include data about the time delay. The transceiver can extract the data to determine the time delay. The transceiver can use the internal clock and the time delay to control a timing for transmitting a wireless communication.

In block 716, the transceiver transmits the wireless communication at a specific time. For example, the transceiver can transmit the wireless communication to another transceiver after the time delay determined in block 714.

In some aspects, systems and methods for synchronizing downhole communications using timing signals are provided according to one or more of the following examples:

Example #1

A system that is positionable in a wellbore can include a transceiver. The transceiver can be positionable external to a casing string. The transceiver can be remotely programmable while in the wellbore to set an internal clock using (i) a timing signal wirelessly transmitted from a source and (ii) a position of the transceiver in the wellbore relative to the source, the internal clock being usable for controlling a timing of the transceiver for transmitting a wireless signal.

Example #2

The system of Example #1 may feature the source of the timing signal being a computing device positioned at a surface of the wellbore.

Example #3

The system of any of Examples #1-2 may feature the transceiver being operable for determining a reference time using the timing signal and the position in the wellbore, the reference time being usable by a plurality of transceivers to synchronize wireless communications among the plurality of transceivers.

Example #4

The system of any of Examples #1-3 may feature the transceiver including a processing device and a memory device. The memory device can store instructions executable by the processing device for causing the processing device to receive the timing signal at a particular time. The instructions can also cause the processing device to determine: (i) the position of the transceiver relative to the source and (ii) a temperature in the wellbore, based on data from sensors. The instructions can also cause the processing device to determine a time delay by applying the position of the transceiver, the temperature in the wellbore, and a speed of sound to an algorithm usable to compare the speed of sound to the position of the transceiver to determine the time delay between the particular time and the reference time. The instructions can also cause the processing device to determine the reference time by subtracting the time delay from the particular time.

Example #5

The system of any of Examples #1-4 may feature a plurality of transceivers. The plurality of transceivers can be positioned external to the casing string and programmable to receive the timing signal and synchronize internal clocks in the plurality of transceivers using the timing signal for determining when to transmit wireless signals.

Example #6

The system of any of Examples #1-5 may feature the source including a closer transceiver that is positioned closer to a surface of the wellbore than the transceiver.

Example #7

The system of any of Examples #1-6 may feature the transceiver being operable to transmit another timing signal to a farther transceiver that is positioned farther from the surface of the wellbore than the transceiver.

Example #8

The system of any of Examples #1-7 may feature the transceiver being programmable to include a known position of the transceiver relative to the source prior to the transceiver being positioned in the wellbore.

Example #9

A communication system that is positionable in a wellbore can include a first transceiver that is positionable external to a casing string. The first transceiver can be remotely programmable while in the wellbore to set a first internal clock using (i) a first timing signal wirelessly transmitted from a source and (ii) a first position of the first transceiver in the wellbore relative to the source. The first internal clock can be usable for controlling a first timing of the first transceiver for transmitting a wireless signal. The communication system can also include a second transceiver that is positionable external to the casing string. The second transceiver can be remotely programmable while in the wellbore to set a second internal clock using (i) a second timing signal wirelessly transmitted from the first transceiver and (ii) a second position of the second transceiver in the wellbore relative to the first transceiver. The second internal clock can be usable for controlling a second timing of the second transceiver for transmitting a second wireless signal. The second timing of the second transceiver being different from the first timing of the first transceiver.

Example #10

The communication system of Example #9 may feature a computing device positioned at a surface of the wellbore and operable to transmit the first timing signal to the first transceiver.

Example #11

The communication system of any of Examples #9-10 may feature the first transceiver being operable for determining a reference time using the first timing signal. The second transceiver can be operable for determining the reference time using the second timing signal. The reference time can be usable by the first transceiver and the second transceiver to synchronize wireless communications between the first transceiver and the second transceiver.

Example #12

The communication system of any of Examples #9-11 may feature the first transceiver including a processing device and a memory device. The memory device can store instructions executable by the processing device for causing the processing device to receive the timing signal at a particular time. The instructions can also cause the processing device to determine: (i) the first position of the first transceiver relative to the source of the first timing signal and (ii) a temperature in the wellbore, based on data from sensors. The instructions can also cause the processing device to determine a time delay by applying the first position of the first transceiver, the temperature in the wellbore, and a speed of sound to an algorithm usable to compare the speed of sound to the first position of the first transceiver to determine the time delay between the particular time and the reference time. The instructions can also cause the processing device to determine the reference time by subtracting the time delay from the particular time.

Example #13

The communication system of any of Examples #9-12 may feature a third transceiver. The third transceiver can be positioned closer to a surface of the wellbore than the first transceiver and the second transceiver. The third transceiver can be operable to transmit the first timing signal to the first transceiver.

Example #14

The communication system of any of Examples #9-13 may feature the second transceiver being operable to transmit a third timing signal to a fourth transceiver that is positioned farther from a surface of the wellbore than the second transceiver.

Example #15

The communication system of any of Examples #9-14 may feature the first transceiver and the second transceiver each being programmable to include known respective positions relative to the source prior to being positioned in the wellbore.

Example #16

A method can include receiving a timing signal by a programmable transceiver positioned external to a casing string in a wellbore. The method can also include determining, by the programmable transceiver, a position of the programmable transceiver in the wellbore relative to a source of the timing signal. The method can also include setting, by the programmable transceiver, an internal clock based on the timing signal and the position, the internal clock controlling a timing of the programmable transceiver transmitting a wireless communication. The method can also include transmitting the wireless communication at a particular time based on the timing.

Example #17

The method of Example #16 may feature setting the internal clock including determining, by the programmable transceiver, a reference time using the timing signal and the position in the wellbore relative to the source of the timing signal and synchronizing wireless communications among a plurality of transceivers positioned external to the casing string in the wellbore using the reference time.

Example #18

The method of Example #17 may feature determining the reference time including determining the position of the programmable transceiver relative to the source and a temperature in the wellbore based on data from sensors. The method may also feature determining the reference time including determining a time delay by applying the position of the programmable transceiver, the temperature in the wellbore, and a speed of sound to an algorithm that compares the speed of sound to the position of the programmable transceiver relative to the source to determine the time delay between the particular time and the reference time. The method may also feature determining the reference time including determining the reference time by subtracting the time delay from the particular time.

Example #19

The method of any of Examples #16-17 may feature receiving the timing signal from a closer programmable transceiver that is positioned closer to a surface of the wellbore than the programmable transceiver.

Example #20

The method of any of Examples #16-19 may feature transmitting another timing signal to a farther programmable transceiver that is positioned farther from the surface of the wellbore than the programmable transceiver.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system that is positionable in a wellbore, the system comprising:
a transceiver that is positionable external to a casing string and remotely programmable while in the wellbore to set an internal clock to a reference time that is calculated using (i) a timing signal wirelessly transmitted from a source and (ii) a position of the transceiver in the wellbore relative to the source, wherein the transceiver is configured to transmit a wireless signal at a time that is offset from the reference time by a predetermined amount.

2. The system of claim 1, wherein the source of the timing signal is a computing device positioned at a surface of the wellbore.

3. The system of claim 1, wherein the transceiver configured to determine the reference time using the timing signal and the position in the wellbore, the reference time being usable by a plurality of transceivers to synchronize wireless communications among the plurality of transceivers.

4. The system of claim 1, wherein the transceiver comprises:
a processing device; and
a memory device in which instructions executable by the processing device are stored for causing the processing device to:
receive the timing signal at a particular time;
determine (i) the position of the transceiver relative to the source and (ii) a temperature in the wellbore, based on data from sensors;
determine a time delay by applying the position of the transceiver, the temperature in the wellbore, and a speed of sound to an algorithm usable to compare the speed of sound to the position of the transceiver to determine the time delay between the particular time and the reference time; and
determine the reference time by subtracting the time delay from the particular time.

5. The system of claim 1, further comprising a plurality of transceivers positioned external to the casing string and programmable to receive the timing signal and synchronize respective internal clocks in the plurality of transceivers using the timing signal for determining when to transmit wireless signals.

6. The system of claim 1, wherein the source comprises a closer transceiver that is positioned closer to a surface of the wellbore than the transceiver.

7. The system of claim 6, wherein the transceiver is operable to transmit another timing signal to a farther transceiver that is positioned farther from the surface of the wellbore than the transceiver.

8. The system of claim 1, wherein the transceiver is programmable to include a known position of the transceiver relative to the source prior to the transceiver being positioned in the wellbore.

9. A communication system that is positionable in a wellbore, the communication system comprising:
a first transceiver that is positionable external to a casing string and remotely programmable while in the wellbore to set a first internal clock to a reference time that is calculated using (i) a first timing signal wirelessly transmitted from a source and (ii) a first position of the first transceiver in the wellbore relative to the source, wherein the first transceiver is configured to transmit a first wireless signal at a first time that is offset from the reference time by a first predetermined amount; and
a second transceiver that is positionable external to the casing string and remotely programmable while in the wellbore to set a second internal clock to the reference time, wherein the second transceiver is configured to calculate the reference time using (i) a second timing signal wirelessly transmitted from the first transceiver and (ii) a second position of the second transceiver in the wellbore relative to the first transceiver, and wherein the second transceiver is configured to transmit a second wireless signal at a second time that is offset from the reference time by a second predetermined amount that is different from the first predetermined amount.

10. The communication system of claim 9, further comprising a computing device positioned at a surface of the wellbore and operable to transmit the first timing signal to the first transceiver.

11. The communication system of claim 9, wherein the first transceiver and the second transceiver are configured to synchronize wireless communications between the first transceiver and the second transceiver based on the reference time.

12. The communication system of claim 9, wherein the first transceiver comprises:
a processing device; and
a memory device in which instructions executable by the processing device are stored for causing the processing device to:
receive the first timing signal at a particular time;
determine (i) the first position of the first transceiver relative to the source of the first timing signal and (ii) a temperature in the wellbore, based on data from sensors;
determine a time delay by applying the first position of the first transceiver, the temperature in the wellbore, and a speed of sound to an algorithm usable to compare the speed of sound to the first position of the first transceiver to determine the time delay between the particular time and the reference time; and
determine the reference time by subtracting the time delay from the particular time.

13. The communication system of claim 9, further comprising a third transceiver that is positioned closer to a surface of the wellbore than the first transceiver and the second transceiver, the third transceiver being operable to transmit the first timing signal to the first transceiver.

14. The communication system of claim 9, wherein the first transceiver and the second transceiver are each programmable to include known respective positions relative to the source prior to being positioned in the wellbore.

15. A method comprising:
receiving a timing signal by a programmable transceiver positioned external to a casing string in a wellbore;
determining, by the programmable transceiver, a position of the programmable transceiver in the wellbore relative to a source of the timing signal;
setting, by the programmable transceiver, an internal clock to a reference time that is calculated using the timing signal and the position; and
transmitting, by the programmable transceiver, a wireless communication at a time that is offset from the reference time by a predetermined amount.

16. The method of claim 15, further comprising:
synchronizing wireless communications among a plurality of transceivers positioned external to the casing string in the wellbore using the reference time.

17. The method of claim 15, wherein determining the reference time comprises:
receiving the timing signal at a particular time;
determining the position of the programmable transceiver relative to the source and a temperature in the wellbore based on data from sensors;
determining a time delay by applying the position of the programmable transceiver, the temperature in the wellbore, and a speed of sound to an algorithm that compares the speed of sound to the position of the programmable transceiver relative to the source to determine the time delay between the particular time and the reference time; and
determining the reference time by subtracting the time delay from the particular time.

18. The method of claim 15, further comprising:
receiving the timing signal from a closer programmable transceiver that is positioned closer to a surface of the wellbore than the programmable transceiver.

19. The method of claim 18, further comprising:
transmitting another timing signal to a farther programmable transceiver that is positioned farther from the surface of the wellbore than the programmable transceiver.

20. The system of claim 1, wherein the timing signal specifies the predetermined amount.

* * * * *